United States Patent
Berg et al.

(10) Patent No.: US 8,131,727 B2
(45) Date of Patent: Mar. 6, 2012

(54) PRESERVING RELATIONSHIPS OF MAPPED VIEWS IN AN OBJECT MODEL

(75) Inventors: Daniel Christopher Berg, Cary, NC (US); Charles Dyer Bridgham, Cary, NC (US); John David Lanuti, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1947 days.

(21) Appl. No.: 10/999,337

(22) Filed: Nov. 30, 2004

(65) Prior Publication Data

US 2006/0117031 A1 Jun. 1, 2006

(51) Int. Cl.
*G06F 7/00* (2006.01)

(52) U.S. Cl. ........................................ 707/741; 707/802

(58) Field of Classification Search .................. None
See application file for complete search history.

(56) References Cited

U.S. PATENT DOCUMENTS

| | | | | |
|---|---|---|---|---|
| 5,553,218 A | * | 9/1996 | Li et al. | 707/102 |
| 5,956,725 A | * | 9/1999 | Burroughs et al. | 707/100 |
| 6,101,502 A | * | 8/2000 | Heubner et al. | 707/103 R |
| 6,279,008 B1 | * | 8/2001 | Tung Ng et al. | 707/102 |
| 6,360,223 B1 | * | 3/2002 | Ng et al. | 707/100 |
| 6,704,024 B2 | * | 3/2004 | Robotham et al. | 345/581 |
| 2003/0028545 A1 | * | 2/2003 | Wang et al. | 707/100 |

FOREIGN PATENT DOCUMENTS

WO WO 99/33006 * 7/1999

OTHER PUBLICATIONS

Velegrakis et al., "Preserving Mapping Consistency Under Schema Changes", The VLDB Journal (2004) 13: 274-293 / Digital Object Identifier (DOI).*

* cited by examiner

*Primary Examiner* — Tim T Vo
*Assistant Examiner* — Hasanul Mobin
(74) *Attorney, Agent, or Firm* — Cuenot, Forsythe & Kim, LLC

(57) ABSTRACT

A method, apparatus, and computer instructions are provided for preserving relationships of mapped views in an object model. A database model, including database tables and views is examined and a foreign key constraint list is derived for the view. A set of objects for an object model is generated from the database model. Based on the derived foreign key list, relationships are generated between objects mapped to the view and objects mapped to the target table of the view's derived foreign key.

21 Claims, 7 Drawing Sheets

PRESERVING RELATIONSHIPS OF MAPPED VIEWS IN AN OBJECT MODEL

BACKGROUND OF THE INVENTION

1. Technical Field

The present invention relates to an improved data processing system. In particular, the present invention relates to mapped views of an object model in a data processing system. Still more particularly, the present invention relates to preserving relationships of mapped views in an object model in a data processing system.

2. Description of Related Art

In most development environments, developers generate a set of objects from a database model in order to import data into an application development tool. The database model comprises database tables and views. A view is a read only collection of columns from one or more database tables. A view may be used to normalize data from multiple database tables.

Currently, a view only contains columns from the base tables and it does not include constraints such as primary key and foreign key constraints. A primary key constraint contains a set of columns whose values uniquely identify an entry in a table. A foreign key constraint is used to create relationship between two tables. Foreign key constraints maintain referential integrity between two tables by ensuring values in the columns of the table owning the foreign key constraint match the column values from that primary key constraint of the target table. The columns of the foreign key constraint must match in order, type, and value of the primary key constraint of the target table. Primary key can be interchanged with primary key constraint and foreign key can be interchanged with foreign key constraint.

In some development environments, a virtual primary key for a database view can be obtained by the union of all primary key columns in the underlying database tables. However, there are no foreign keys associated with the virtual primary key. Since foreign keys do not exist in database views, modeled objects derived from these views are void of any relationships.

To alleviate this problem, some developers will change the view to extend its scope to include all related tables and columns of interest. However, this requires additional development efforts and causes the backend shape of the base object to change, since the view has to include all extended tables and columns. Thus, the purpose of the view is defeated or it becomes too normalized to be of any use.

Therefore, it would be advantageous to have a method and apparatus for programmatically discovering foreign keys in a view from the view definition in underlying base tables, such that relationships are automatically maintained in an object model.

BRIEF SUMMARY OF THE INVENTION

The present invention provides a method, apparatus, and computer instructions for preserving relationships of mapped views in an object model. When a view is mapped, the present invention examines definitions of a database model. The database model includes database tables and views. The present invention recognizes relationships between sets of objects for an object model based on the definitions of database tables and views by iterating each column in a view and determining associated foreign key constraints from the underlying base tables. The foreign key columns based on the foreign key constraints form a derived foreign key in the view, which is mapped to the corresponding object model relationship.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein

DETAILED DESCRIPTION OF THE INVENTION

Figure 1:
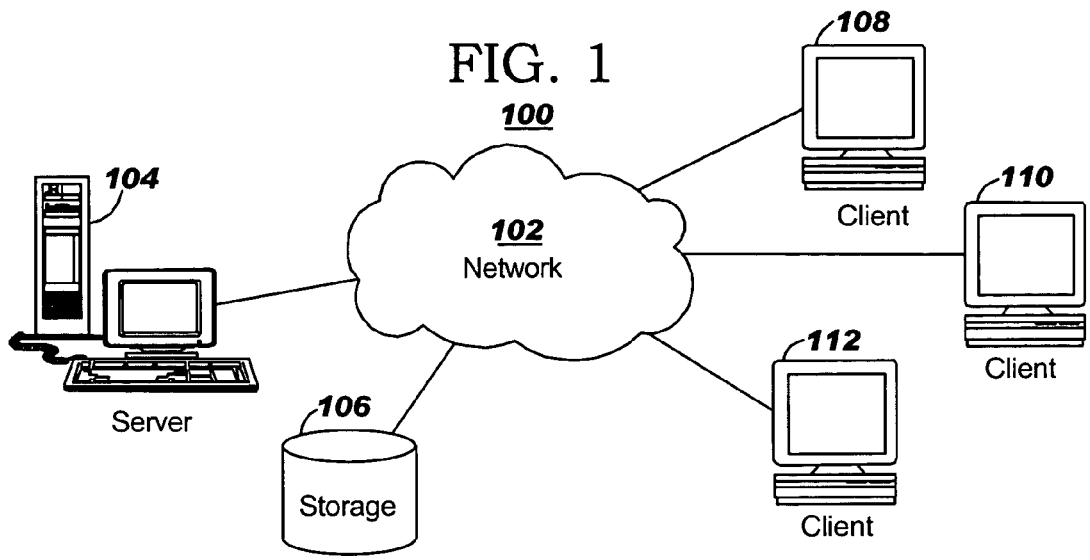
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
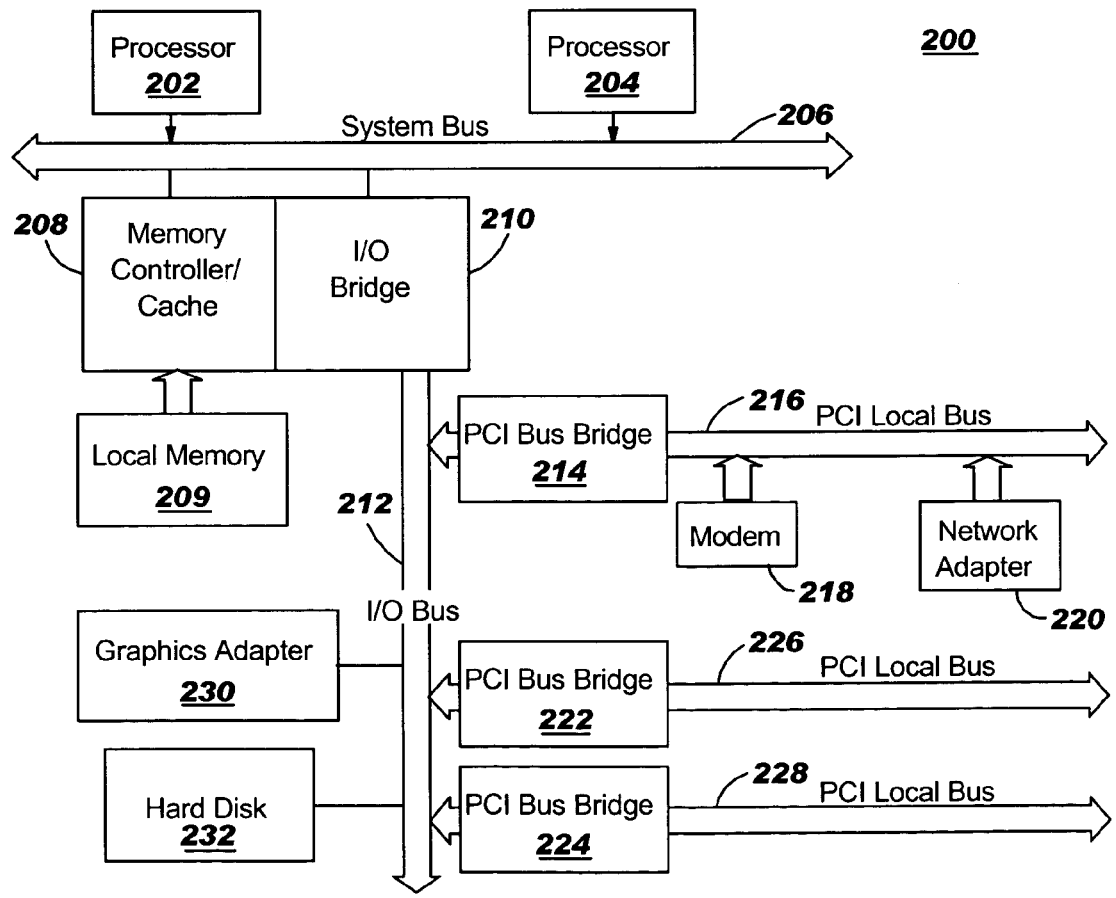
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries system, a product of International Business Machines Corporation in Armonk, N.Y., running the Advanced Interactive Executive (AIX) operating system or LINUX operating system.

Figure 3:
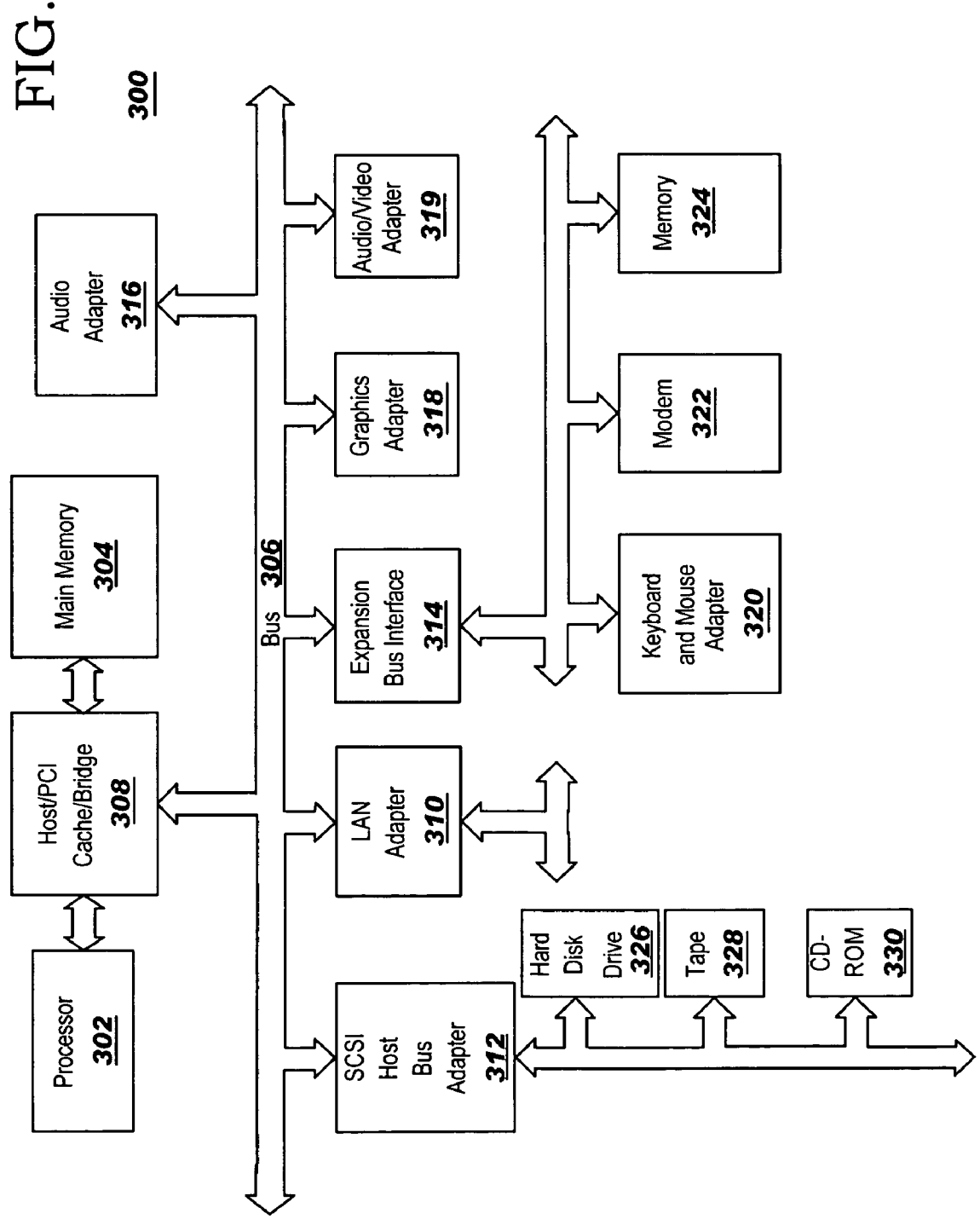
FIG. 3 is a block diagram illustrating a data processing system in which a preferred embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java™ may run in conjunction with the operating system and provide calls to the operating system from Java™ programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for preserving relationships of mapped views in an object model. The present invention captures not only the view definition, but also the underlying base table definitions and constraints when a database view is mapped. A view is formed when a developer or user chooses one or more columns from one or more base tables.

The present invention captures foreign key constraints in a database view from the base table definitions by iterating over each column in a view and determining if the column is contained in one of the foreign key constraints in the base table. A base table is a table from which the view column is obtained. If the column is contained in a foreign key constraint in the base table and all of the columns for that foreign key constraint are included in the view, the foreign key constraint is added to the view's foreign key list. Once a foreign key list is built, a set of objects for an object model is generated based on the database tables and views within the database model.

When the set of objects is generated, the present invention uses the view foreign key list to generate relationships between objects in the object model to represent the foreign key constraints in the view's base tables. In a simple case, the relationships are generated by creating a relationship between the object mapped to the view and the object mapped to the target database table of the derived foreign key. Similarly, if the target database table of the foreign key is also a base table for another mapped view within the database model, a relationship is created between the object mapped to the view and the object mapped to the view that has the derived foreign key's target database table as a base table.

Figure 4:
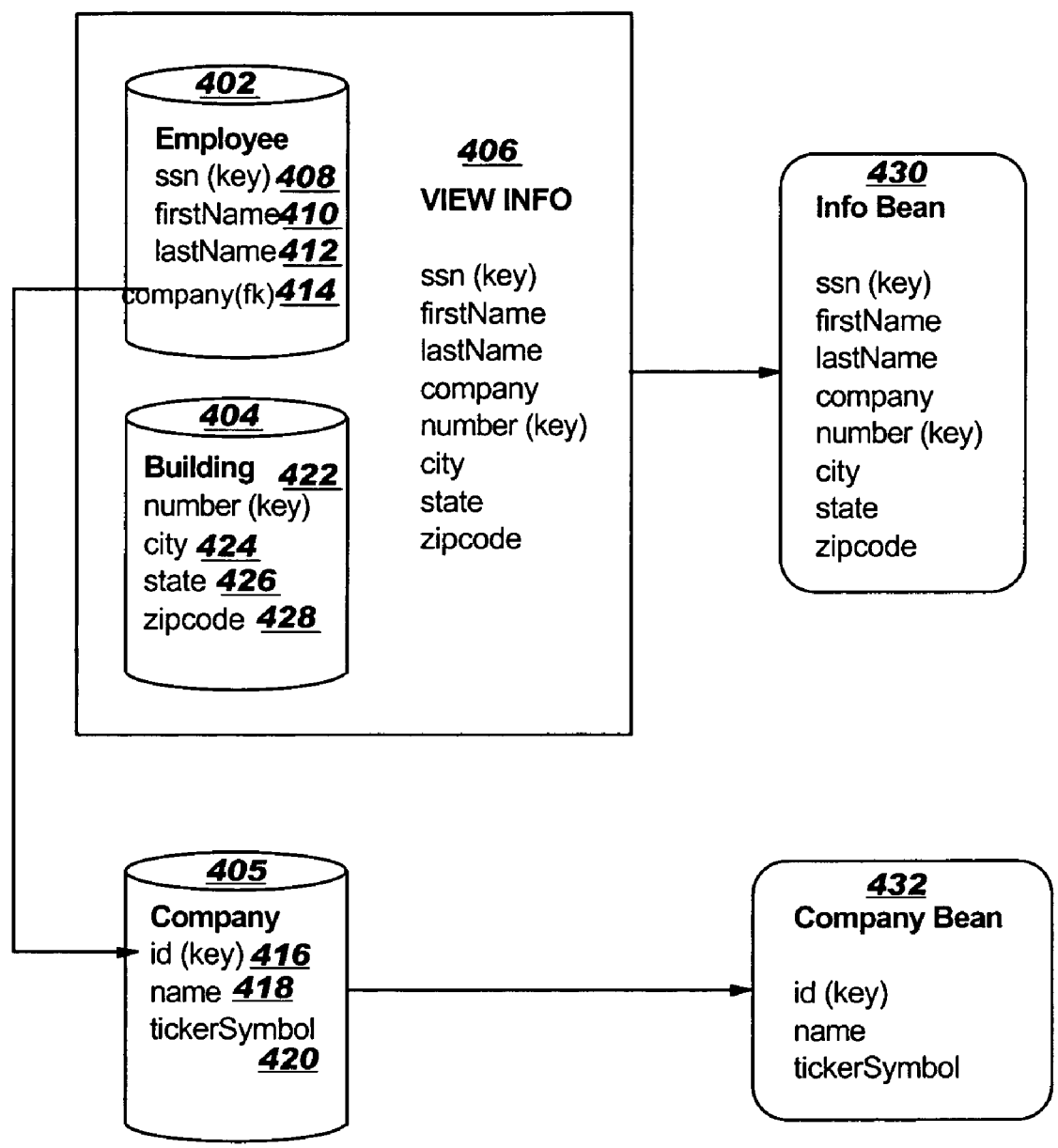
FIG. 4 is a known database to object model mapping.

Turning now to FIG. 4, a known database to object model mapping is depicted. Database model 400 includes three database tables, employee table 402, building table 404, and company table 405. In addition, the database model 400 also includes a database view, info 406 which is a view on employee 402 and building 404 base tables. Employee table 402 includes a primary key column, ssn 408, firstName column 410, lastName column 412, and company column 414. Company column 414 is a foreign key column that targets the primary key column, id 416, from company table 405. There are a number of columns contained in the info view 406, including, ssn column 408, firstName column 410, lastName column 412 from employee table 402, as well as number column 422, city column 424, state column 426, and zipCode column 428 from building table 404.

To complete the mapping, developers generate a set of objects based on view info 406 and company table 405. The generated info bean 430 includes a field for each column in view info 406. The generated company bean 432 includes a field for each column from company table 405. While primary key columns ssn 408 and number 422 are represented in generated info bean 430 and primary key column id 416 is represented in company bean 432, the company foreign key column 414 is not detected as being a foreign key column in view info 406. Thus, there is no relationship between generated info bean 430 and company bean 432 that represents a relationship between foreign key column company 414 in employee table 402 and the id column 416 in company table 405. Furthermore, the company column represented in view info 406 is treated as a simple field in generated info bean 430.

Figure 5A:
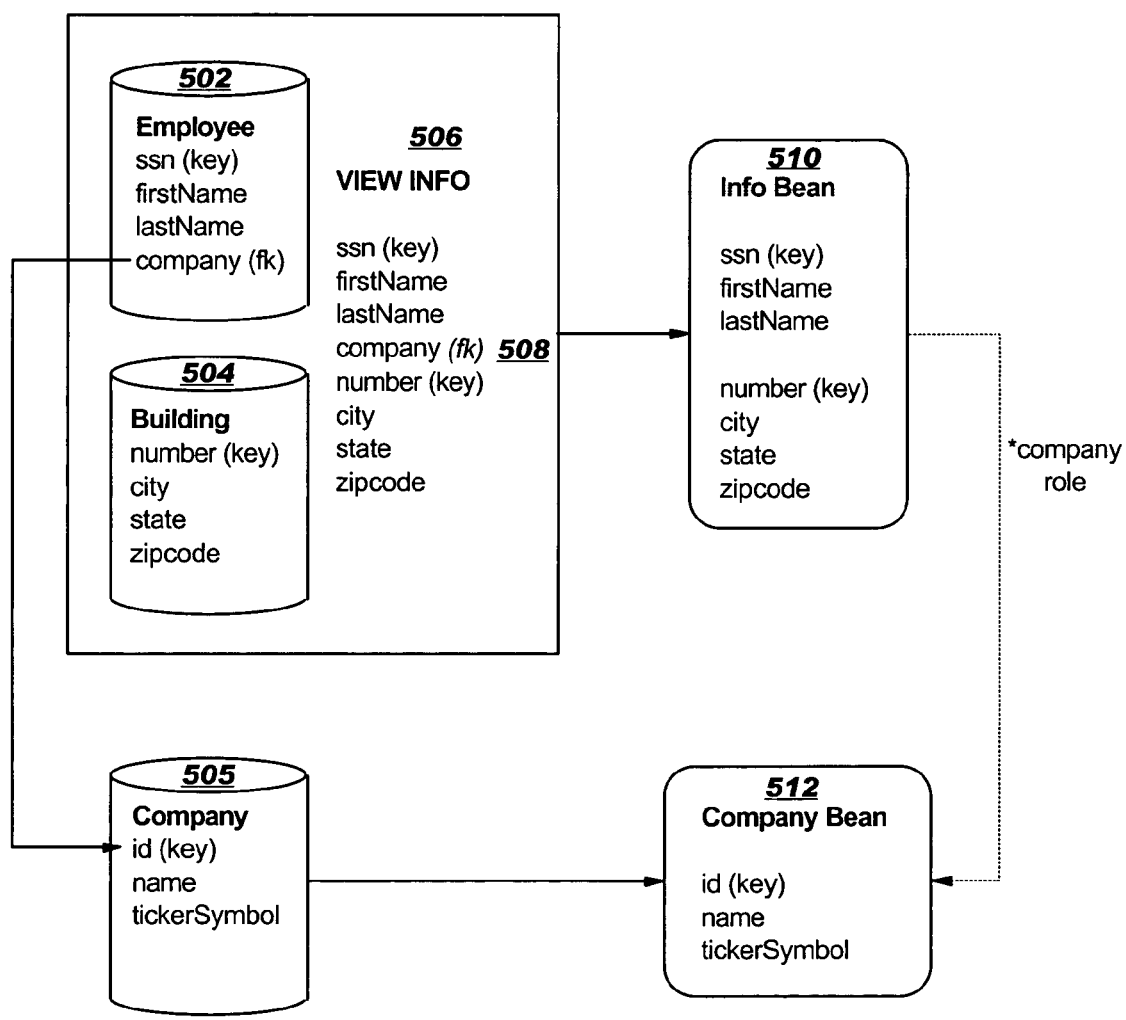
FIG. 5A is a diagram illustrating an exemplary database to object model mapping that preserves relationships of mapped views in an object model with a single primary key column in accordance with a preferred embodiment of the present invention.

Turning now to FIG. 5A, a diagram illustrating an exemplary database to object model mapping that preserves relationships of mapped views in an object model with a single primary key column is depicted in accordance with a preferred embodiment of the present invention. Database model 500 may be implemented in a data processing system, such as data processing system 200 in FIG. 2. In this example implementation, database model 500 includes employee table 502, building table 504, and company table 505. Tables 502-506 are the same as tables 402-406 in FIG. 4.

Also included in database model 500 is view info 506, which includes the same columns as view info 406 in FIG. 4. Column company 508 is a derived foreign key column that is discovered by the present invention when the columns of view info 506 are examined. The foreign key constraint containing column company 508 is added to the view's derived foreign key list by a mapper. As a person of ordinary skill in the art would appreciate, a mapper may be a generic object that performs a mapping between database artifacts to an object within an object model. The mapper is used to generate the associated modeled objects.

When info bean 510 and company bean 512 are generated by the mapper, the mapper also generates a relationship between objects in the object model for each derived foreign key constraint in the view's derived foreign key list. In this case, a relationship is generated between info bean 510 and company bean 512 and no company field is present in info bean 510. Thus, the object model now includes a representation of the foreign key relationship between the base tables.

Figure 5B:
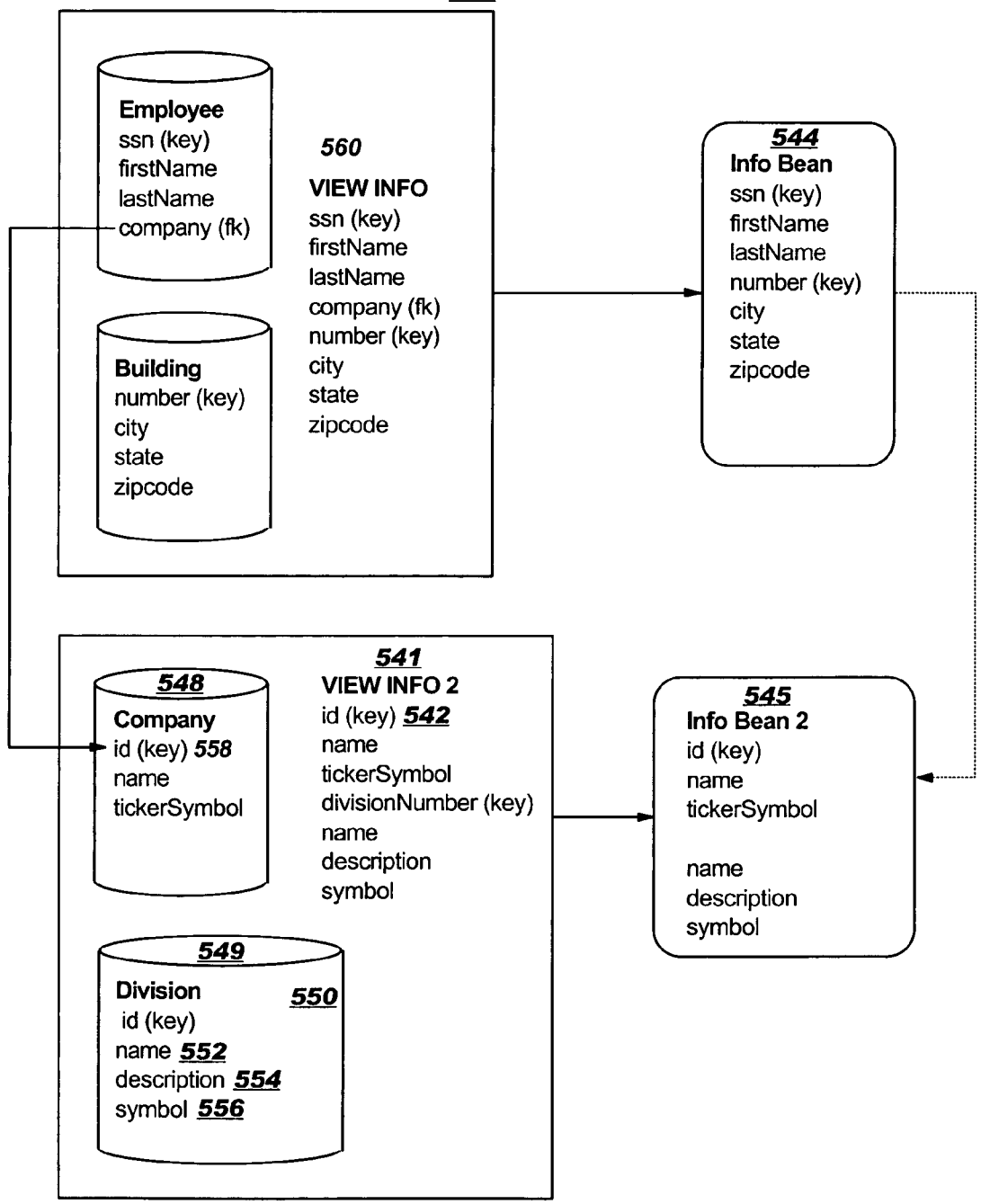
FIG. 5B is a diagram illustrating an exemplary database to object model mapping that preserves relationships of mapped views in an object model with another view that includes a target table of the foreign key constraint in the first view as a base table.

Turning now to FIG. 5B, a diagram illustrating an exemplary database to object model mapping that preserves relationships of mapped views in an object model with another view that includes a target table of the foreign key constraint in the first view as a base table is depicted in accordance with a preferred embodiment of the present invention. As shown in FIG. 5B, database model 540 includes a second view, view info 2 541.

View info 2 541 not only includes columns from company table 548, but also columns from division table 549. These columns include id column 550, name column 552, description column 554, and symbol column 556. View info 2 541 has a base table company 548, which is the target of the derived foreign key in the view info. The value for id column 550 in division table 549 is the same as id column 548 in Company table 548.

When the objects in object model are generated from the mappings to the database objects, a relationship between info bean 544 and info bean 2 545 is also generated. View info 2 541 includes all of the columns from company table 548 and division table 549, including the target primary key column id 542 of the derived foreign key constraint in the view info. Thus, the present invention preserves the relationship between the object mapped to the view and the object mapped to another view that includes a target of the first view's derived foreign key as a base table. Since the derived primary key for view info 2 541 matches in size, shape, and type to the derived foreign key in view info 560, the relationship can be preserved.

Figure 5C:
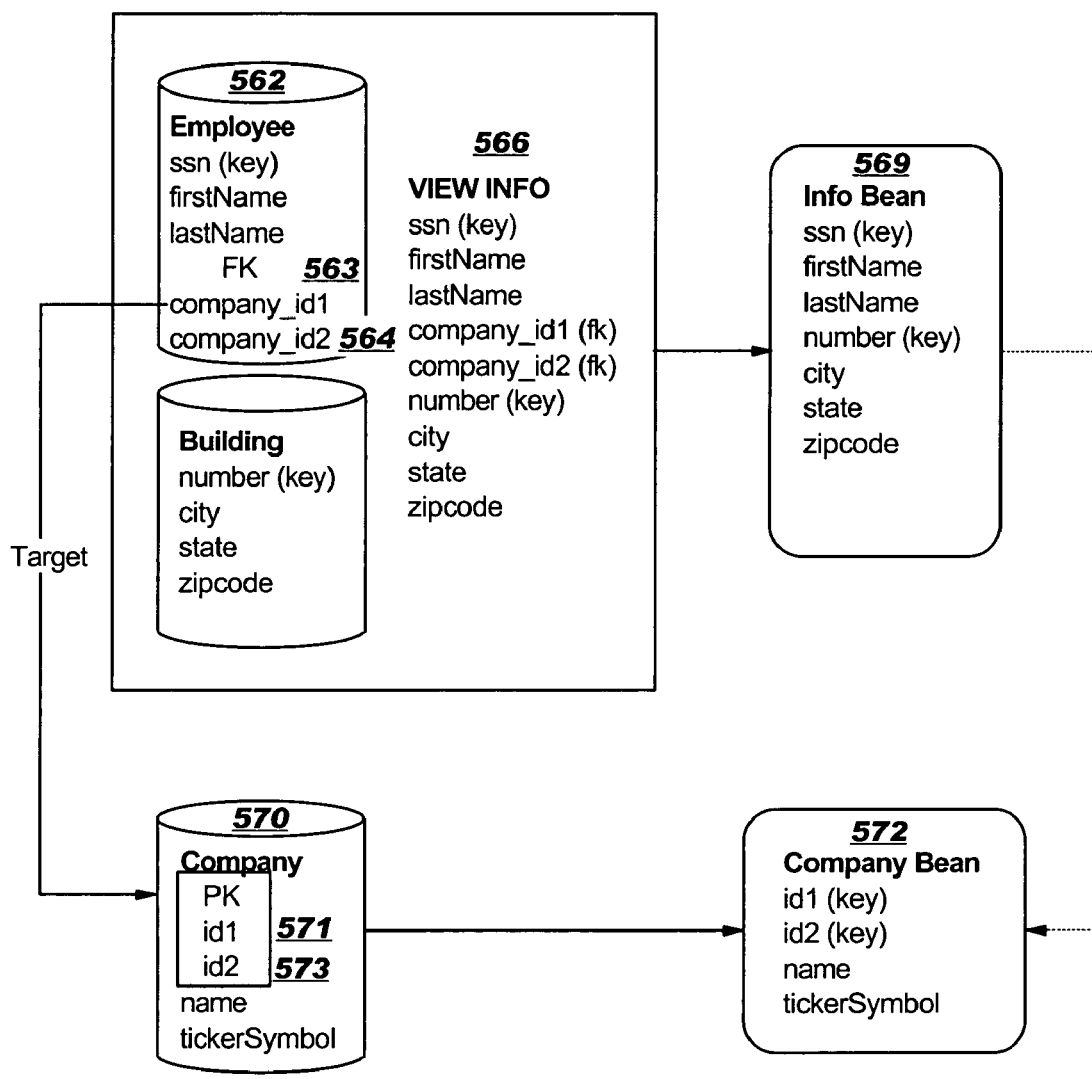
FIG. 5C is a diagram of an exemplary database to object model mapping that preserves relationships of mapped views in an object model with complex foreign key constraints in accordance with a preferred embodiment of the present invention.

Turning now to FIG. 5C, a diagram of an exemplary database to object model mapping that preserves relationships of mapped views in an object model with foreign key constraints is depicted in accordance with a preferred embodiment of the present invention. As shown in FIG. 5C, employee table 562 has a foreign key constraint which includes two foreign key columns, company_id1 563 and company_id2 564. The target for the foreign key constraint of employee table 562 is the primary key of the company table 570, id1 column 571, and id2 column 573.

In this example, view info 566 is different from view info 506 in FIG. 5A, in that view info 566 includes two foreign key columns for the complex foreign key constraint, the company_id1 column 563 and company_id2 column 564. When info bean 569 and company bean 572 are generated, the present invention preserves the relationship of the foreign key constraint by creating a relationship between the info bean 569 and company bean 572, which includes both key fields in the company bean 572 associated with primary key columns id1 571 and id2 572 in company table 570.

Thus, the present invention not only preserves the relationship between an object mapped to a view with a foreign key constraint in a base table, the present invention also preserves the relationship between an object mapped to the view and the corresponding foreign key constraint in a base table if the constraint contains more than one foreign key column and all of those columns are present in the view.

Figure 6:
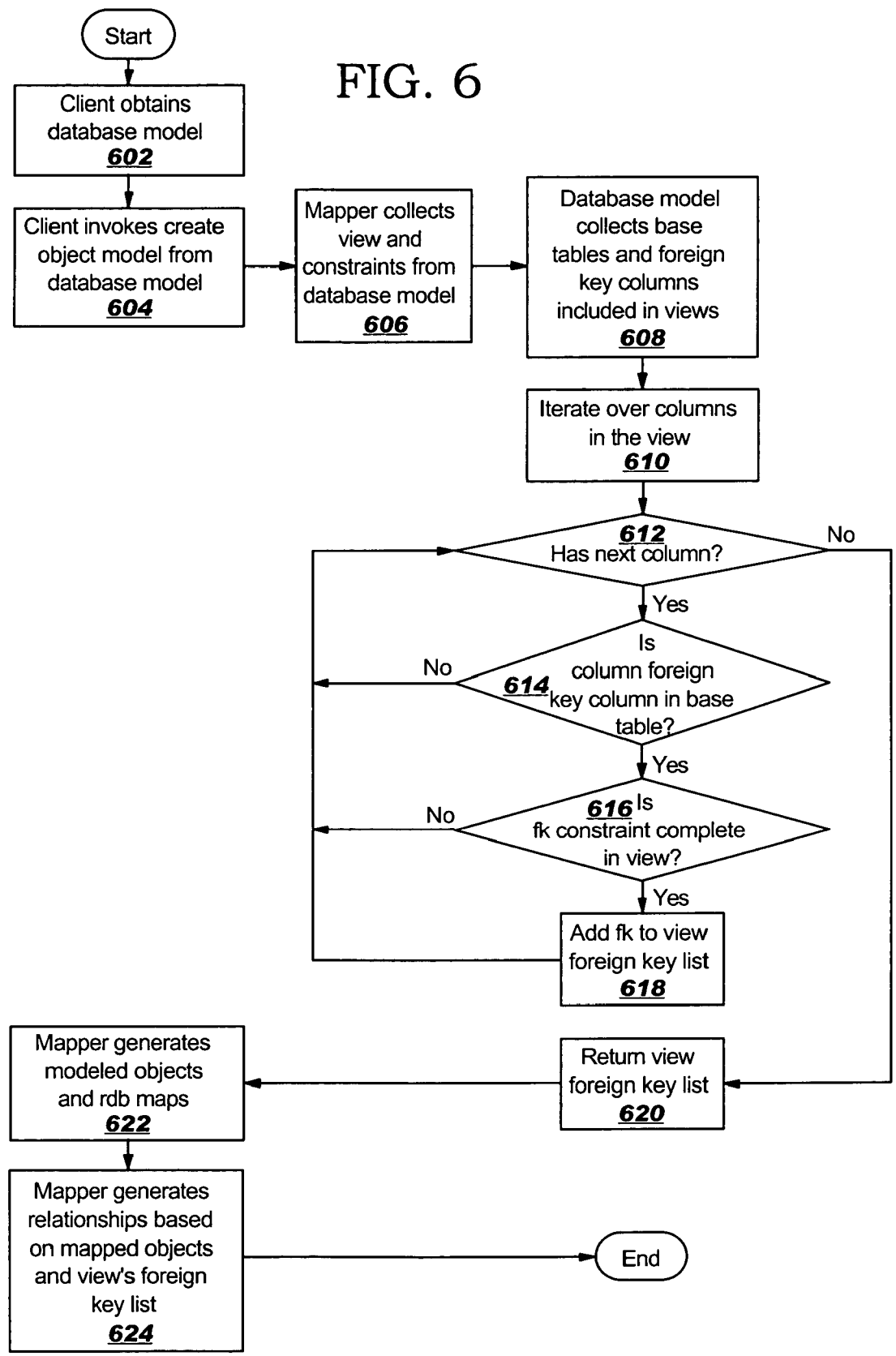
FIG. 6 is a flowchart of an exemplary process for preserving relationship of mapped views in an object model in accordance with a preferred embodiment of the present invention.

Turning now to FIG. 6, a flowchart of an exemplary process for preserving relationship of mapped views in an object model is depicted in accordance with a preferred embodiment of the present invention. As shown in FIG. 6, the process begins when a client imports a database model into an application tool (step 602), such as WebSphere Application Development Studio, a product available from International Business Machines Corporation. The database model includes a number of database tables, database views, and foreign key constraints relationships between the database tables. A database view includes a number of columns from a set of base tables from which the columns are derived. The database view does not define any primary key or foreign key constraints.

Next, the client requests an object model to be generated from the set of database tables and database views in the database model (step 604). In turn, a mapper used by the present invention to collect the selected views and associate base table constraints in the database model (step 606). The step is performed by examining the database tables and database views in the database model.

The database model then collects base tables for the selected database view and generates a list of columns that are included in the selected database view (step 608). The database model then iterates over each column in the list of columns for the selected view (step 610). A determination is then made by the database model as to whether additional columns are present in the selected view (step 612). If no additional columns are present in the selected view, the process continues to step 620.

If additional columns are present in the view, the database model determines if the column is contained in a foreign key constraint for the base table from which the column is obtained (step 614). In other words, the database model determines whether the column is a foreign key column from a base table.

If the column is not contained in a foreign key constraint for the base table, the process returns to step 612. However, if the column is contained in a foreign key constraint for the base table, the database model determines if the underlying base table's foreign key constraint is complete (step 616). This means that all foreign key columns contained in that constraint have been detected within the view. Thus, if the foreign key has two columns in the constraint, such as company_id1 563 and company_id2 564 in FIG. 5C, both columns have to be in the view, such as view info 566, in order for this foreign key constraint to be maintained by the view. Since the column was found for the given foreign key constraint, this information is cached for future use.

Turning back to step 616, if the underlying base table's foreign key constraint is not complete, it is recorded that a foreign key column was found for the detected foreign key constraint and the process returns to step 612. Otherwise, the database model adds the foreign key constraint to the view's derived foreign key list (step 618). The process then returns to step 612 until all the columns in the view have been examined and the process reaches step 620 when no additional columns are found.

At step 620, the database model returns the view's derived foreign key list to the mapper. In turn, the mapper generates a set of objects in an object model based on the database tables and views within the database model (step 622). In addition, the mapper generates relationships between the set of objects in the object model based on how the set of objects are mapped in the corresponding database tables and views.

A relationship is created for each derived foreign key constraint in the view's derived foreign key list. Thus, a relationship is created between an object that is mapped to the view and an object that is mapped to a target table of that derived foreign key, for example, from the info bean to the company bean.

If the target table is also a base table of another view in the database model, a relationship will also be created between an object that is mapped to the view and an object that is mapped to the target database view that has the derived foreign key's target table as a base table. Thus, a relationship is created between the object mapped to the first view and the object mapped to the second view, for example, from the info bean to the info 2 bean.

In summary, the present invention provides a solution that programmatically discovers foreign keys from a view definition in a database model. With the present invention, relationships between generated data objects are automatically maintained. The present invention not only maps the relationship between the object that is mapped to the view and a base table object, but also maps the relationship between the mapped object to an object mapped to another view that includes the target of the relationship from the first view as a base table.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, the method comprising:
    obtaining a database model, wherein the database model includes a view and a plurality of base tables, wherein the view comprises a column from at least one base table in the plurality of tables, and wherein the at least one base table contains at least one foreign key constraint;
    determining whether the column is constrained in at least one of the at least one foreign key constraints in the base table; and
    responsive to the column being contained in at least one of the at least one foreign key constraints and all of a set of columns for the at least one foreign key constraint being included in the view, adding the at least one foreign key constraint to a key list associated with the view.

2. The method of claim 1, wherein the view comprises generating a plurality of columns in which the column is included, and wherein the method further comprises:
    iterating over the plurality of columns the step of adding the at least one foreign key constraint to a key list associated with the view, wherein adding is responsive to a corresponding column in the plurality of columns being contained in at least one of the at least one foreign key constraints and all of the set of columns for the at least one foreign key constraint being included in the view.

3. The method of claim 1, further comprising:
    caching the column temporarily.

4. The method of claim 1, further comprising:
    returning the foreign key list to a mapper.

5. The method of claim 4, wherein the mapper generates a relationship between a first object and a second object in an object model of the database, wherein the first object represents the view and the second object represents a target base table of a derived foreign key in the foreign key list.

6. The method of claim 4, wherein the mapper generates a relationship between a first object and a second object in an object model of the data, wherein the first object represents the view and the second object represents a second view, wherein the second view includes a target table of the at least one foreign key constraint from the view as a base table.

7. A data processing system comprising:
obtaining means for obtaining a database model, wherein the database model includes a view and a plurality of base tables, wherein the view comprises a column from at least one base table in the plurality of tables, and wherein the at least one base table contains at least one foreign key constraint;
determining means for determining whether the column is constrained in at least one of the at least one foreign key constraints in the base table; and
adding means for, responsive to the column being contained in at least one of the at least one foreign key constraints and all of a set of columns for the at least one foreign key constraint being included in the view, adding the at least one foreign key constraint to a key list associated with the view.

8. The data processing system of claim 7, wherein the view comprises generating a plurality of columns in which the column is included, and wherein the data processing system further comprises:
iterating means for iterating over the plurality of columns the step of adding the at least one foreign key constraint to a key list associated with the view, wherein adding is responsive to a corresponding column in the plurality of columns being contained in at least one of the at least one foreign key constraints and all of the set of columns for the at least one foreign key constraint being included in the view.

9. The data processing system of claim 7, further comprising:
caching means for caching the column temporarily.

10. The data processing system of claim 7, further comprising:
returning means for returning the foreign key list to a mapper.

11. The data processing system of claim 10, wherein the mapper generates a relationship between a first object and a second object in an object model of the database, wherein the first object represents the view and the second object represents a target base table of a derived foreign key in the foreign key list.

12. The data processing system of claim 10, wherein the mapper generates a relationship between a first object and a second object in an object model of the database, wherein the first object represents the view and the second object represents a second view, wherein the second view includes a target table of the at least one foreign key constraint from the view as a base table.

13. A computer program product comprising a computer readable storage medium having stored therein computer usable program instructions, the computer usable program instructions are executable on a computer hardware device and comprise:
first instructions for obtaining a database model, wherein the database model includes a view and a plurality of base tables, wherein the view comprises a column from at least one base table in the plurality of tables, and wherein the at least one base table contains at least one foreign key constraint;
second instructions for determining whether the column is constrained in at least one of the at least one foreign key constraints in the base table; and
third instructions for, responsive to the column being contained in at least one of the at least one foreign key constraints and all of a set of columns for the at least one foreign key constraint being included in the view, adding the at least one foreign key constraint to a key list associated with the view.

14. The computer program product of claim 13, wherein the view comprises generating a plurality of columns in which the column is included, and wherein the computer program product further comprises:
fourth instructions for iterating over the plurality of columns the step of adding the at least one foreign key constraint to a key list associated with the view, wherein adding is responsive to a corresponding column in the plurality of columns being contained in at least one of the at least one foreign key constraints and all of the set of columns for the at least one foreign key constraint being included in the view.

15. The computer program product of claim 13, further comprising:
fourth instructions for caching the column temporarily.

16. The computer program product of claim 13, further comprising:
ninth instructions for returning the foreign key list to a mapper.

17. The computer program product of claim 16, wherein the mapper comprises:
first sub-instructions for generating a relationship between a first object and a second object in an object model of the database, wherein the first object represents the view and the second object represents a target base table of a derived foreign key in the foreign key list.

18. The computer program product of claim 16, wherein the mapper comprises:
first sub-instructions for generating a relationship between a first object and a second object in an object model of the database, wherein the first object represents the view and the second object represents a second view, wherein the second view includes a target table of the at least one foreign key constraint from the view as a base table.

19. The method of claim 1 further comprising
using the foreign key list to generate a relationship between a first object and a second object in an object model of the database, wherein the relationship represents foreign key constraints in the plurality of base tables.

20. The data processing system of claim 7 further comprising
using means for using the foreign key list to generate a relationship between a first object and a second object in an object model of the database, wherein the relationship represents foreign key constraints in the plurality of base tables.

21. The computer program product of claim 13 further comprising
four instructions for using the foreign key list to generate a relationship between a first object and a second object in an object model of the database, wherein the relationship represents foreign key constraints in the plurality of base tables.

* * * * *